(12) United States Patent
Hahn et al.

(10) Patent No.: US 12,282,180 B2
(45) Date of Patent: *Apr. 22, 2025

(54) STEALTH DEVICE (71) Applicant: INDUSTRY-ACADEMIC COOPERATION FOUNDATION YONSEI UNIVERSITY, Seoul (KR)

(72) Inventors: Jae Won Hahn, Seoul (KR); Hyeon Bo Shim, Seoul (KR); Ki Wook Han, Gyeonggi-do (KR); Joo Kwon Song, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 715 days.

This patent is subject to a terminal disclaimer.

(21) Appl. No.: 17/647,957

(22) Filed: Jan. 13, 2022

(65) Prior Publication Data

US 2022/0283344 A1 Sep. 8, 2022

(30) Foreign Application Priority Data

Mar. 3, 2021 (KR) .......................... 10-2021-0027802

(51) Int. Cl.
| | |
|---|---|
| G02B 5/20 | (2006.01) |
| B32B 3/26 | (2006.01) |
| B32B 7/023 | (2019.01) |
| B32B 7/025 | (2019.01) |
| F41H 3/00 | (2006.01) |
| G02B 5/00 | (2006.01) |

(52) U.S. Cl.
CPC .............. *G02B 5/204* (2013.01); *B32B 3/266* (2013.01); *B32B 7/023* (2019.01); *B32B 7/025* (2019.01); *F41H 3/00* (2013.01); *G02B 5/008* (2013.01); *G02B 5/208* (2013.01)

(58) Field of Classification Search
None
See application file for complete search history.

(56) References Cited

U.S. PATENT DOCUMENTS

| | | | | |
|---|---|---|---|---|
| 2007/0171120 A1* | 7/2007 | Puscasu | ............. | H01Q 15/0066 342/53 |
| 2017/0219746 A1* | 8/2017 | Nagao | ........................ | C23F 1/02 |
| 2018/0069319 A1* | 3/2018 | Cho | ........................ | B32B 3/14 |
| 2019/0322078 A1* | 10/2019 | Hahn | ........................ | F41H 3/00 |
| 2020/0285082 A1* | 9/2020 | Chanda | ....................... | F41H 3/00 |
| 2023/0273496 A1* | 8/2023 | Hahn | ........................ | E06B 9/24 359/263 |

* cited by examiner

*Primary Examiner* — Derek S. Chapel
(74) *Attorney, Agent, or Firm* — NORTON ROSE FULBRIGHT US LLP (57) ABSTRACT

Disclosed is a stealth device that has a double-band stealth function against millimeter-wavelength electromagnetic waves, has high absorption at a near-infrared laser wavelength, and has low emissivity of mid-infrared light and long-infrared light. The stealth device includes a wavelength-selective absorption pattern layer made of a material having electrical conductivity, wherein the wavelength-selective absorption pattern layer is composed of conductive thin-film patterns capable of causing plasmonic resonance at a first wavelength and a second wavelength different from the first wavelength; and a dielectric layer disposed below the wavelength-selective absorption pattern layer and made of a dielectric material.

14 Claims, 6 Drawing Sheets

STEALTH DEVICE

CROSS-REFERENCE TO RELATED APPLICATION

This application claims a benefit under 35 U.S.C. § 119(a) of Korean Patent Application No. 10-2021-0027802 filed on Mar. 3, 2021, on the Korean Intellectual Property Office, the entirety of disclosure of which is incorporated herein by reference for all purposes.

BACKGROUND

Field

The present disclosure relates to a stealth device capable of coping with an infrared laser-guided weapon, an infrared image-guided weapon that detects thermal infrared light, and millimeter wave radar.

Description of Related Art

Recently, under advent of various advanced detection equipment that detect ground weapons such as next-generation tanks, armored vehicles, and unmanned combat vehicles, and development of offensive weapons using the various advanced detection equipment, threats to not only ground weapons but also defense manpower are rapidly increasing. With development of aerial power such as attack helicopters and unmanned aerial vehicles, and long-range detection and precision guided missile technologies, advanced ground weapons may be exposed to more diverse enemy attacks. Thus, a need for improved stealth technology is gradually increasing.

In particular, third-generation anti-tank missiles such as Longbow Hellfire operate in a millimeter wave (MMW) radar and laser guided manner. Fourth-generation anti-tank missiles such as FGM-148, Javelin, and AT-1K Raybolt operate in a thermal infrared guided manner. A top-attack intelligence bomb acting as a deadly threat to tanks is equipped with millimeter-wave radar and thermal sensors to identify a target.

Therefore, in modern and future ground weapon systems, it is necessary to develop stealth technology that may simultaneously cope with infrared laser, millimeter wave radar, and thermal infrared detection technology.

However, conventional MMW researches have been mainly conducted only based on communication and electromagnetic shielding. Research on stealth technology application fields is insufficient. There is no research on multi-band stealth devices coping with infrared and MMW wave.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a stealth device which may selectively absorb near-infrared light of a wavelength mainly used for infrared laser-guided weapons to perform a stealth function against the infrared laser-guided weapon, and may reflect mid-wavelength infrared, long-wavelength infrared or far-infrared rays using a wavelength-selective absorption pattern layer to significantly lower heat emissivity and thus, cope with infrared image-guided weapons that detect thermal infrared rays.

Another purpose of the present disclosure is to provide a stealth device capable of selectively absorbing dual-band electromagnetic waves of frequency (35 GHz and 94 GHz) bands mainly used for mm-wave radar, thereby exhibiting a dual-band stealth function against the mm-wave radar.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a stealth device comprising: a wavelength-selective absorption pattern layer including at least one conductive thin-film pattern having near-infrared light transmissive holes defined therein capable of selectively transmitting near-infrared light therethrough; a near-infrared absorption layer disposed below the wavelength-selective absorption pattern layer to absorb near-infrared light which has passed through the near-infrared light transmissive holes; and a dielectric layer disposed between the wavelength-selective absorption pattern layer and the near-infrared absorption layer and made of a dielectric material.

In one implementation of the first aspect, each of the near-infrared light transmissive holes has a circular shape with a diameter of 0.5 to 2.0 μm.

In one implementation of the first aspect, the near-infrared light transmissive holes defined in the conductive thin-film pattern are regularly arranged, wherein a spacing between centers of two adjacently-disposed near-infrared light transmissive holes of the near-infrared light transmissive holes is 1.5 to 2.5 times of a diameter of each of the near-infrared light transmissive holes.

In one implementation of the first aspect, the near-infrared absorption layer is made of at least one selected from a group consisting of graphite, germanium (Ge), silicon carbide (SiC), zinc oxide (ZnO), gallium nitride (GaN), gallium arsenide (GaAs), indium arsenide (InAs) and iron oxide ($Fe_2O_3$ or $Fe_3O_4$).

In one implementation of the first aspect, the conductive thin-film pattern has a uniform thickness in a range of 100 nm to 10 μm.

In one implementation of the first aspect, the wavelength-selective absorption pattern layer is composed of a plurality of unit areas, wherein each unit area has a square shape having two sides parallel to a first direction and two sides parallel to a second direction perpendicular to the first direction, wherein in each unit area, the conductive thin-film pattern includes: a first thin-film pattern having a planar shape of a first square having two sides parallel to the first direction and two sides parallel to the second direction, wherein each side of the first square has a first length; a second thin-film pattern having a planar shape of a second square having two sides parallel to the first direction and two sides parallel to the second direction, wherein each side of the second square has a second length smaller than the first length, wherein a diagonal line of the first thin-film pattern and a diagonal line of the second thin-film pattern coincide with one of two diagonal lines of the unit area; and two third thin-film patterns, wherein each of the two third thin-film patterns has a rectangular planar shape in which a long side parallel to the second direction has the first length and a short side parallel to the first direction has the second length, wherein one of the two third thin-film patterns is disposed adjacent to a first side of the first thin-film pattern, while the other thereof is disposed adjacent to a second side of the first thin-film pattern perpendicular to the first side of the first thin-film pattern.

In one implementation of the first aspect, the near-infrared light transmissive holes are defined in each of the first to third thin-film patterns.

In one implementation of the first aspect, the wavelength-selective absorption pattern layer has a first absorption peak at a first wavelength corresponding to a frequency region of 20 to 50 GHz and a second absorption peak at a second wavelength corresponding to a frequency region of 80 to 110 GHz.

In one implementation of the first aspect, a length of each side of the first thin-film pattern is in a range of 1.0 to 4.0 mm, and a length of each side of the second thin-film pattern is in a range of 0.01 to 0.5 mm.

In one implementation of the first aspect, each of a spacing between a long side of one of the third thin-film patterns and one side of the first thin-film pattern facing toward the long side of said one of the third thin-film patterns, and a spacing between a short side of said one of the third thin-film patterns and one side of the second thin-film pattern facing toward the short side of said one of the third thin-film patterns is in a range of 10 to 100 μm.

In one implementation of the first aspect, the dielectric layer is made of: an organic dielectric material selected from a group consisting of polyethylene terephthalate (PET), polymethyl methacrylate (PMMA), acrylonitrile butadiene styrene copolymer (ABS), polycarbonate (PC), and polyaramid; or an inorganic dielectric material selected from a group consisting of silicon oxide ($SiO_2$), silicon nitride ($Si_3N_4$) and glass.

In one implementation of the first aspect, the device further comprises a reflective layer disposed below the near-infrared absorption layer, and made of a material capable of reflecting at least a portion of infrared ray.

A second aspect of the present disclosure provides a stealth device comprising: a wavelength-selective absorption pattern layer made of a material having electrical conductivity, wherein the wavelength-selective absorption pattern layer is composed of conductive thin-film patterns capable of causing plasmonic resonance at a first wavelength and a second wavelength different from the first wavelength; and a dielectric layer disposed below the wavelength-selective absorption pattern layer and made of a dielectric material.

In one implementation of the second aspect, the wavelength-selective absorption pattern layer includes a plurality of unit areas, wherein each unit area has a square planar shape having two sides parallel to a first direction and two sides parallel to a second direction perpendicular to the first direction, wherein the conductive thin-film patterns are disposed in each of the unit areas.

In one implementation of the second aspect, the conductive thin-film patterns includes: a first thin-film pattern having a planar shape of a first square having two sides parallel to the first direction and two sides parallel to the second direction, wherein each side of the first square has a first length; a second thin-film pattern having a planar shape of a second square having two sides parallel to the first direction and two sides parallel to the second direction, wherein each side of the second square has a second length smaller than the first length, wherein a diagonal line of the first thin-film pattern and a diagonal line of the second thin-film pattern coincide with one of two diagonal lines of the unit area; and two third thin-film patterns, wherein each of the two third thin-film patterns has a rectangular planar shape in which a long side parallel to the second direction has the first length and a short side parallel to the first direction has the second length, wherein one of the two third thin-film patterns is disposed adjacent to a first side of the first thin-film pattern, while the other thereof is disposed adjacent to a second side of the first thin-film pattern perpendicular to the first side of the first thin-film pattern.

In one implementation of the second aspect, the wavelength-selective absorption pattern layer has a first absorption peak at a first wavelength corresponding to a frequency region of 20 to 50 GHz and a second absorption peak at a second wavelength corresponding to a frequency region of 80 to 110 GHz.

In one implementation of the second aspect, the first to third thin-film patterns have the same thickness in a range of 100 nm to 10 μm, wherein a length of each side of the first thin-film pattern is in a range of 1.0 to 4.0 mm, and a length of each side of the second thin-film pattern is in a range of 0.01 to 0.5 mm, wherein each of a spacing between a long side of one of the third thin-film patterns and one side of the first thin-film pattern facing toward the long side of said one of the third thin-film patterns, and a spacing between a short side of said one of the third thin-film patterns and one side of the second thin-film pattern facing toward the short side of said one of the third thin-film patterns is in a range of 10 to 100 μm.

The stealth device according to the present disclosure may selectively absorb near-infrared light of a wavelength mainly used for infrared laser-guided weapons to perform a stealth function against the infrared laser-guided weapon, and may reflect mid-wavelength infrared, long-wavelength infrared or far-infrared rays using the wavelength-selective absorption pattern layer to significantly lower heat emissivity and thus, cope with infrared image-guided weapons that detect thermal infrared rays. Further, when the wavelength-selective absorption pattern layer is patterned to cause resonance in a wavelength of the millimeter wave region, the stealth device according to the present disclosure may perform the stealth function against the millimeter wave (94 GHz and 35 GHz) radars which are mainly applied to anti-tank missiles or the top-attack intelligence missiles.

Further, the stealth device according to the present disclosure may be capable of selectively absorbing dual-band electromagnetic waves of frequency (35 GHz and 94 GHz) bands mainly used for mm-wave radar, thereby exhibiting a dual-band stealth function against the mm-wave radar.

In addition to the effects as described above, specific effects in accordance with the present disclosure will be described together with following detailed descriptions for carrying out the disclosure.

DETAILED DESCRIPTION

For simplicity and clarity of illustration, elements in the FIGS. are not necessarily drawn to scale. The same reference numbers in different FIGS. represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
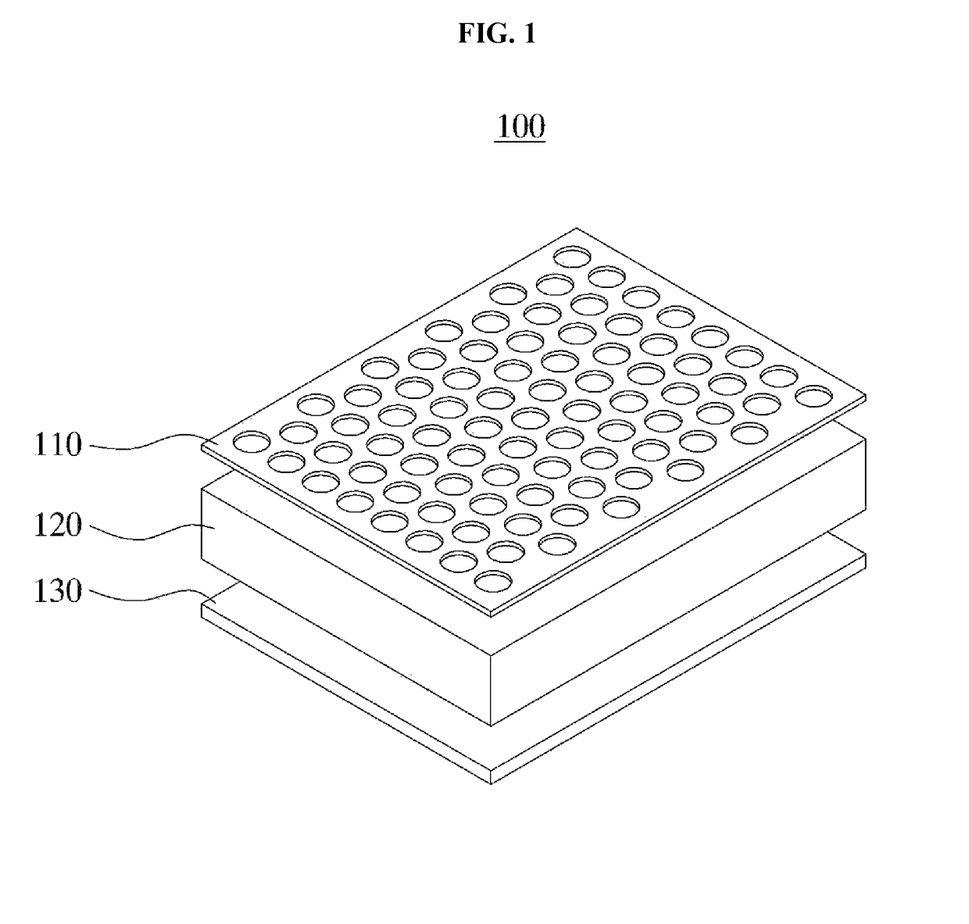
FIG. 1 is an exploded perspective view for illustrating a stealth device according to an embodiment of the present disclosure.
Figure 2:
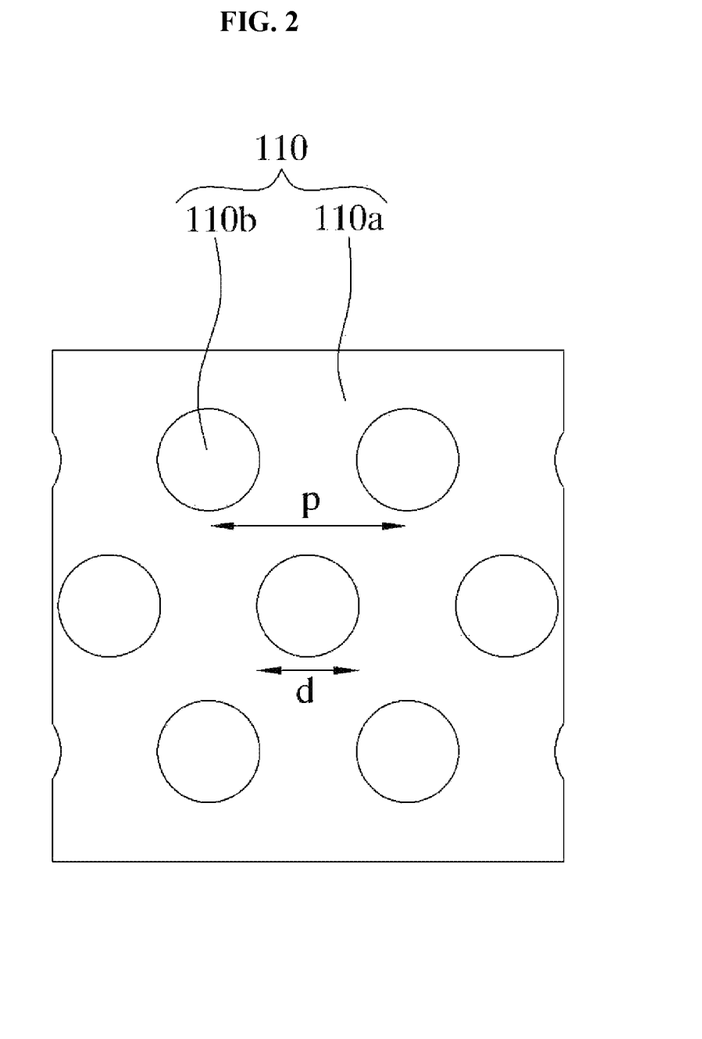
FIG. 2 is a partial plan view of a wavelength-selective absorption pattern layer shown in FIG. 1.

FIG. 1 is an exploded perspective view for illustrating a stealth device according to an embodiment of the present disclosure, and FIG. 2 is a partial plan view of a wavelength-selective absorption pattern layer shown in FIG. 1.

Referring to FIG. 1 and FIG. 2, a stealth device 100 according to an embodiment of the present disclosure may include a wavelength-selective absorption pattern layer 110, a dielectric layer 120 and a near-infrared absorption layer 130.

The stealth device 100 according to this embodiment may be disposed on a surface of an object (not shown) having the stealth function and thus may exhibit a stealth function against infrared laser-guided weapons and infrared image-guided weapons that detect thermal infrared rays, and may exhibit a stealth function against frequency bands (35 GHz and 94 GHz) as mainly used for millimeter wave lasers.

The wavelength-selective absorption pattern layer 110 may include at least one conductive thin-film pattern 110a having a uniform thickness and having near-infrared light transmissive holes 110b defined therein capable of selectively transmitting the near-infrared light therethrough. The wavelength-selective absorption pattern layer 110 may absorb electromagnetic waves in a predefined wavelength range using plasmonic resonance or the like. Although a single conductive thin-film pattern 110a is shown in FIG. 1, the present disclosure is not limited thereto. The wavelength-selective absorption pattern layer 110 may include a plurality of conductive thin-film patterns 110a patterned in various shapes to control a resonance wavelength. In this connection, the anti-tank missiles or top-attack intelligence missiles are equipped with millimeter-wave (94 GHz and 35 GHz) radars. Thus, the wavelength-selective absorption pattern layer 110 may be patterned to cause resonance in a wavelength of the millimeter wave region to cope with the millimeter wave radar.

In an embodiment, the conductive thin-film pattern 110*a* may be made of an electrically conductive material capable of inducing surface plasmonic resonance. For example, the conductive thin-film pattern 110*a* may be made of an electrically conductive metal such as gold (Au), silver (Ag), or aluminum (Al), or an electrically conductive oxide such as ITO (indium tin oxide).

A thickness of the conductive thin-film pattern 110*a* is not particularly limited. In an embodiment, the conductive thin-film pattern 110*a* may be formed to a thickness of about 100 nm to 10 μm. In an embodiment, the near-infrared light transmissive holes 110*b* may be formed to extend through the conductive thin-film pattern 110*a* to expose the dielectric layer 120 disposed thereunder. The near-infrared light transmissive holes 110*b* may be formed to cause plasmonic resonance so that near-infrared light of a specific wavelength may pass through the holes and thus may be absorbed into the near-infrared absorption layer 130 disposed thereunder to cope with infrared laser-guided weapons, and, at the same time, to reflect infrared rays of wavelengths other than the specific wavelength, for example, to reflect mid-wavelength infrared, long-wavelength infrared, or far-infrared rays. For example, the near-infrared light transmissive hole 110*b* may be sized such that transmission of the near-infrared light having a wavelength of about 3 μm or smaller therethrough is predominant, while reflection of medium-wave infrared, long-wave infrared, and far-infrared light having a larger wavelength than the wavelength of about 3 μm therefrom is predominant. In an embodiment, the near-infrared light transmissive hole 110*b* may be formed in a circular shape having a diameter d of about 0.5 to 2.0 μm.

When, as described above, the wavelength-selective absorption pattern layer 110 includes the conductive thin-film pattern 110*a* in which the near-infrared light transmissive holes 110*b* are formed, the stealth device 100 according to this embodiment may selectively absorb near-infrared light of a wavelength mainly used for infrared laser-guided weapons, and thus may exhibit a stealth function against the infrared laser-guided weapon. Further, the stealth device 100 according to this embodiment may reflect the mid-wavelength infrared, long-wavelength infrared or far-infrared ray using the wavelength-selective absorption pattern layer 110, thereby significantly lowering heat emissivity and thus coping with infrared image-guided weapons that detect thermal infrared rays.

In one example, when a plurality of near-infrared light transmissive holes 110*b* are formed in the conductive thin-film pattern 110*a*, the near-infrared light transmissive holes 110*b* may be regularly arranged. In one embodiment, when the near-infrared light transmissive holes 110*b* are regularly arranged as described above, a pitch p as a distance between centers of two adjacent near-infrared light transmissive holes 110*b* may be in a range of about 1.5 to 2.5 times a diameter d of the near-infrared light transmissive hole 110*b*. A wavelength of the near-infrared light selectively transmitting through the layer 110 may be adjusted according to the pitch and diameter of the near-infrared light transmissive hole. In general, the near-infrared light transmission peak wavelength increases in proportion to the pitch. A bandwidth increases as the diameter of the transmissive hole increases.

The dielectric layer 120 is disposed below the wavelength-selective absorption pattern layer 110 and may be made of a dielectric material. In one embodiment, the dielectric layer 120 may be made of an organic dielectric material such as polyethylene terephthalate (PET), polymethyl methacrylate (PMMA), acrylonitrile butadiene styrene copolymer (ABS), polycarbonate (PC), polyaramid, etc. or an inorganic dielectric material such as silicon oxide ($SiO_2$), silicon nitride ($Si_3N_4$) or glass.

In one embodiment, an interface may be formed between the dielectric layer 120 may and the conductive thin-film pattern 110*a*. As described above, a portion of a top face of the dielectric layer 120 may be exposed through the near-infrared light transmissive hole 110*b*.

The near-infrared absorption layer 130 may be disposed below the dielectric layer 120, that is, between the dielectric layer 120 and the object. The near-infrared absorption layer 130 may absorb the near-infrared light passing through the near-infrared light transmissive hole 110*b* of the wavelength-selective absorption pattern layer 110. In one embodiment, the near-infrared absorption layer 130 may be made of a material in which absorption of the near-infrared light having a wavelength of about 0.75 to 3 μm is dominant compared to reflection of the near-infrared light having a wavelength of about 0.75 to 3 μm, for example, graphite, germanium (Ge), silicon carbide (SiC), zinc oxide (ZnO), gallium nitride (GaN), gallium arsenide (GaAs), indium arsenide (InAs), iron oxide ($Fe_2O_3$ or $Fe_3O_4$), or the like.

The stealth device 100 according to this embodiment may selectively absorb near-infrared light of a wavelength mainly used for infrared laser-guided weapons to exhibit a stealth function against the infrared laser-guided weapon, and, at the same time, may reflect the mid-wavelength infrared, long-wavelength infrared or far-infrared rays using the wavelength-selective absorption pattern layer to significantly lower the thermal emissivity, thereby coping with infrared image-guided weapons that detect thermal infrared rays. Further, when the wavelength-selective absorption pattern layer is patterned to cause resonance at the wavelength of the millimeter wave region, the stealth device 100 according to this embodiment may exhibit the stealth function against the millimeter wave (94 GHz and 35 GHz) radars which are mainly applied to the anti-tank missiles or top-attack intelligence missiles.

Figure 3:
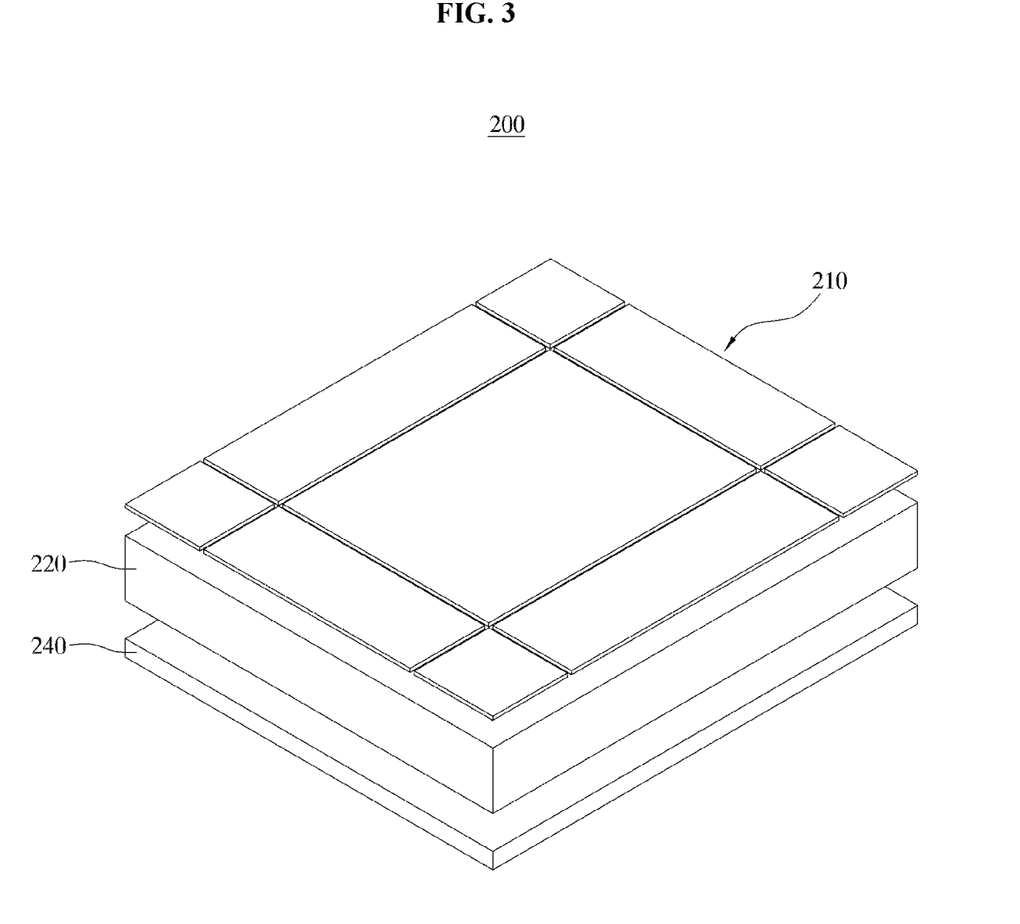
FIG. 3 is an exploded perspective view for illustrating a stealth device according to another embodiment of the present disclosure.
Figure 4:
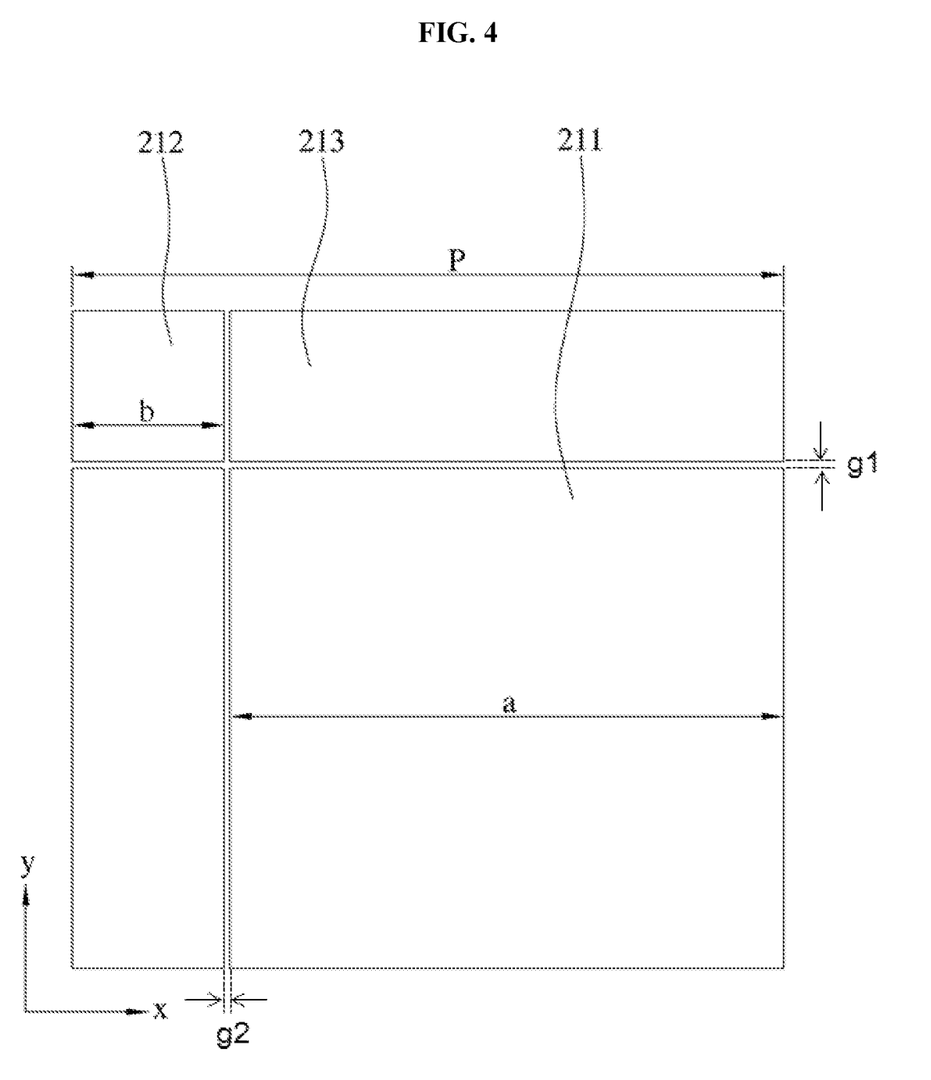
FIG. 4 is a plan view for illustrating a wavelength-selective absorption pattern layer shown in FIG. 3.

FIG. 3 is an exploded perspective view for illustrating a stealth device according to another embodiment of the present disclosure. FIG. 4 is a plan view for illustrating a wavelength-selective absorption pattern layer shown in FIG. 3.

Referring to FIG. 3 and FIG. 4, a stealth device 200 according to another embodiment of the present disclosure may include a wavelength-selective absorption pattern layer 210, a dielectric layer 220 and a reflective layer 230.

The stealth device 200 according to this embodiment may be disposed on the surface of the object (not shown), and may exhibit a stealth function against a plurality of frequencies (35 GHz and 94 GHz) bands mainly used for millimeter wave lasers, and at the same time, may exhibit the stealth function against infrared image-guided weapons which detect thermal infrared rays.

The wavelength-selective absorption pattern layer 210 may cause electrical resonance at first and second wavelengths belonging to the millimeter wave region so as to cope with the frequency bands of 35 GHz and 94 GHz mainly used for millimeter wave radar, and thus may exhibit an absorption peak of the electromagnetic wave at each of these frequencies. For this purpose, the wavelength-selective absorption pattern layer 210 may include a plurality of conductive thin-film patterns 211, 212, and 213.

In an embodiment, the wavelength-selective absorption pattern layer 210 may be composed of a plurality of unit areas, each having a square shape. The plurality of unit areas are regularly arranged. The square includes two sides parallel to a first direction x and two sides parallel to a second direction y perpendicular to the first direction x. The plurality of conductive thin-film patterns 211, 212, and 213 may be disposed and arranged in each of the unit areas.

In an embodiment, the plurality of conductive thin-film patterns 211, 212, and 213 disposed in one unit area may include one first thin-film pattern 211 and one second thin-film pattern 112, and two third thin-film patterns 213.

The first thin-film pattern 211 may have a planar shape of a first square having two sides parallel to the first direction x and two sides parallel to a second direction y, wherein each side has a first length a. The second thin-film pattern 212 may have a planar shape of a second square having two sides parallel to the first direction x and two sides parallel to the second direction y, wherein each side has a second length b smaller than the first length a. Each of the third thin-film patterns 213 may have a planar shape of a rectangular shape in which a long side parallel to the second direction y has the first length a, and a short side parallel to the first direction x has the second length b.

Hereinafter, for convenience of descriptions, two corners of the unit area positioned in a first diagonal among two diagonals of the unit area are referred to as a first corner and a third corner. In this connection, two corners of the unit area positioned in a second diagonal are referred to as a second corner and a fourth corner.

In an embodiment, diagonals of the first thin-film pattern 211 and the second thin-film pattern 212 belong to one of the diagonals of the unit area, while one vertex of the first thin-film pattern 211 and one vertex of the second thin-film pattern 212 may be adjacent to each other.

One of the two third thin-film patterns 213 may be disposed adjacent to a first side of the first thin-film pattern 211, while the other of the two third thin-film patterns 213 may be disposed adjacent to a second side of the first thin-film pattern 211 perpendicular to the first side. For example, one of the long sides of one of the two third thin-film patterns 213 may face the first side of the first thin-film pattern 211, while one of the short sides thereof may face one side of the second thin-film pattern 212. Further, one of the long sides of the other of the two third thin-film patterns 213 may face the second side of the first thin-film pattern 211, while one of the short sides thereof may face another side of the second thin-film pattern 212 perpendicular to said one side of the second thin-film pattern 212. In this case, the long side of the third thin-film pattern 213 and one side of the first thin-film pattern 211 facing toward the long side of the third thin-film pattern 213 may be spaced apart from each other by a first spacing g1. The short side of the third thin-film pattern 213 and one side of the second thin-film pattern 212 facing toward the short side of the third thin-film pattern 213 may be spaced apart from each other by a second spacing g2.

In one embodiment, in order to cope with an infrared image-guided weapon that detects thermal infrared, the stealth device should be able to exhibit low emissivity. For this purpose, it is necessary for the wavelength-selective absorption pattern layer 210 to reflect the medium-wavelength infrared, long-wavelength infrared, and far-infrared rays at a higher reflectivity. To this end, the first to third thin-film patterns 211, 212, and 213 of the wavelength-selective absorption pattern layer 110 may have a filling percentage of about 90% or greater, preferably about 95% or greater in the unit area. For example, each of the spacing g1 between the long side of one of the third thin-film patterns 213 and one side of the first thin-film pattern 211 facing toward the same, and the spacing g2 between the short side of one of the third thin-film patterns 213 and one side of the second thin-film pattern 212 facing toward the same may be in a range of about 10 to 100 μm.

In one embodiment, in order to cope with the millimeter wave (94 GHz and 35 GHz) radars that are mainly applied to radars mounted on the anti-tank missiles or top-attack intelligence missiles, the first to third thin-film patterns 211, 212, and 213 may be formed such that the wavelength-selective absorption pattern layer 110 may have an absorption peak at a first wavelength corresponding to a frequency region of about 20 to 50 GHz and an absorption peak at a second wavelength corresponding to a frequency region of about 80 to 110 GHz. In one embodiment, in order to have the absorption peaks respectively at the first wavelength and the second wavelength, a length of one side of the first thin-film pattern 211 may be in a range of about 1.0 to 4.0 mm, while a length of one side of the second thin-film pattern 212 may be in a range of about 0.01 to 0.5 mm. For example, the length of one side of the first thin-film pattern 211 may be in a range of about 1.3 to 3.0 mm, and the length of one side of the second thin-film pattern 212 may be in a range of about 0.07 to 0.25 mm.

In one example, the first to third thin-film patterns 211, 212, and 213 may be made of the same material, and may have substantially the same thickness. In this case, the first to third thin-film patterns 211, 212, and 213 may be simultaneously formed in a single process. For example, each of the first to third thin-film patterns 211, 212, and 213 may be formed to have a thickness of about 100 nm to 10 μm.

The dielectric layer 220 may be disposed below the wavelength-selective absorption pattern layer 110 and may be made of a dielectric material. The dielectric layer 220 is substantially the same as the dielectric layer 120 of the stealth device 100 as described above with reference to FIGS. 1 and 2, and thus a redundant detailed description thereof will be omitted.

The reflective layer 240 may be disposed below the dielectric layer 220, and may be disposed, for example, between the dielectric layer 220 and the object, and may be made of a material capable of reflecting at least a portion of infrared radiation. For example, the reflective layer 240 may be made of an electrically conductive metal such as gold (Au), silver (Ag), aluminum (Al), or the like, or an electrically conductive oxide such as ITO (indium tin oxide). The reflective layer 240 may be made of a material such as a metal or an alloy. The reflective layer 240 may reflect at least a portion of infrared rays having a wavelength of about 3 μm or larger, for example, medium-wavelength infrared, long-wavelength infrared, and far-infrared rays to the outside such that the at least a portion of infrared rays may not reach the object. This may lower the emissivity of the object onto which the stealth device 200 according to this embodiment is applied.

In one example, the reflective layer 240 may be a component separate from the object. Alternatively, a surface of the object may function as the reflective layer 240.

The stealth device 200 according to the present embodiment may selectively absorb electromagnetic waves of the dual bands as the frequency (35 GHz and 94 GHz) bands mainly used for the millimeter wave radar, using the wavelength-selective absorption pattern layer, and thus may exbibit the double-band stealth function against the millimeter wave radar. Further, the stealth device 200 according to the present embodiment may lower the emissivity of infrared rays therefrom and thus may cope with thermal infrared detection technology.

Figure 5:
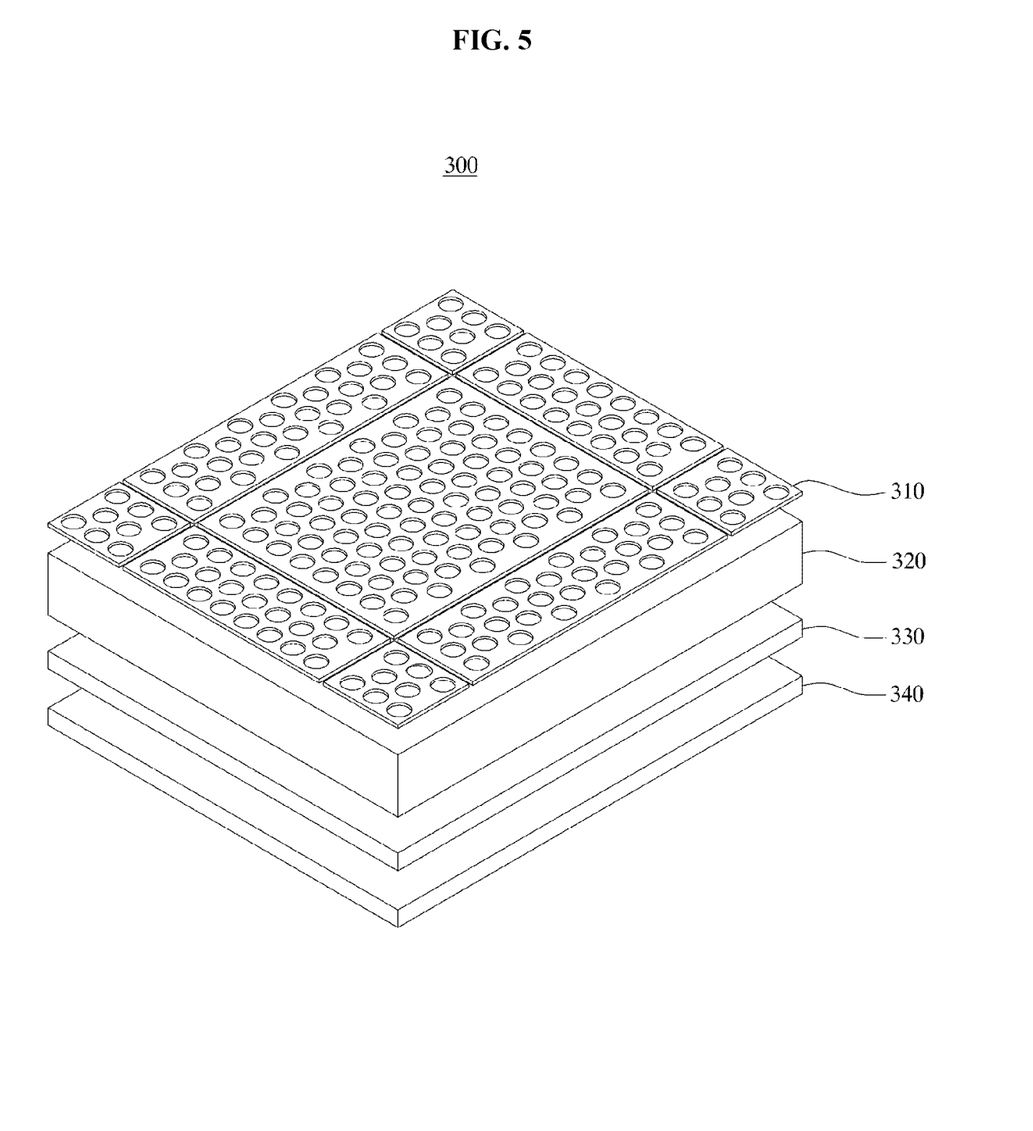
FIG. 5 is an exploded perspective view for illustrating a stealth device according to still another embodiment of the present disclosure.

FIG. 5 is an exploded perspective view for illustrating a stealth device according to still another embodiment of the present disclosure.

Referring to FIG. 5, a stealth device 300 according to still another embodiment of the present disclosure may include a wavelength-selective absorption pattern layer 310, a dielectric layer 320 and a near-infrared absorption layer 330.

The stealth device 300 according to this embodiment may be disposed on the surface of an object (not shown), and thus may exhibit a stealth function against an infrared laser-guided weapon and an infrared image-guided weapon that detects thermal infrared. Further, the stealth device 300 may exhibit a stealth function even against a plurality of frequency bands (35 GHz and 94 GHz) which are mainly used for millimeter wave radar.

The wavelength-selective absorption pattern layer 310 may cause electrical resonance at the first and second wavelengths belonging to the millimeter wave region so as to cope with the frequency bands (35 GHz and 94 GHz) mainly used for millimeter wave radar, and may exhibit an absorption peak of an electromagnetic wave at each of these wavelengths. For this purpose, the layer 310 may include a plurality of conductive thin-film patterns, and may have near-infrared light transmissive holes capable of selectively transmitting near-infrared light therethrough and defined in each of the plurality of conductive thin-film patterns.

The conductive thin-film patterns of the wavelength-selective absorption pattern layer 310 may be substantially the same as the conductive thin-film patterns 211, 212, and 213 of the wavelength-selective absorption pattern layer 210 of the stealth device 200 as described above with reference to FIGS. 3 and 4. The near-infrared light transmissive holes formed in each of the conductive thin-film patterns may be substantially the same as the infrared light transmissive holes 110*b* formed in the conductive thin-film pattern 110*a* of the wavelength-selective absorption pattern layer 110 of the stealth device 100 as described above with reference to FIGS. 1 and 2. Thus, duplicate detailed descriptions thereof are omitted.

Further, the dielectric layer 320 and the near-infrared absorption layer 330 may be substantially the same as the dielectric layer 120 and the near-infrared absorption layer 130 of the stealth device 100 as described above with reference to FIG. 1 and FIG. 2, respectively. Thus, duplicate detailed descriptions thereof are omitted.

Figure 6:
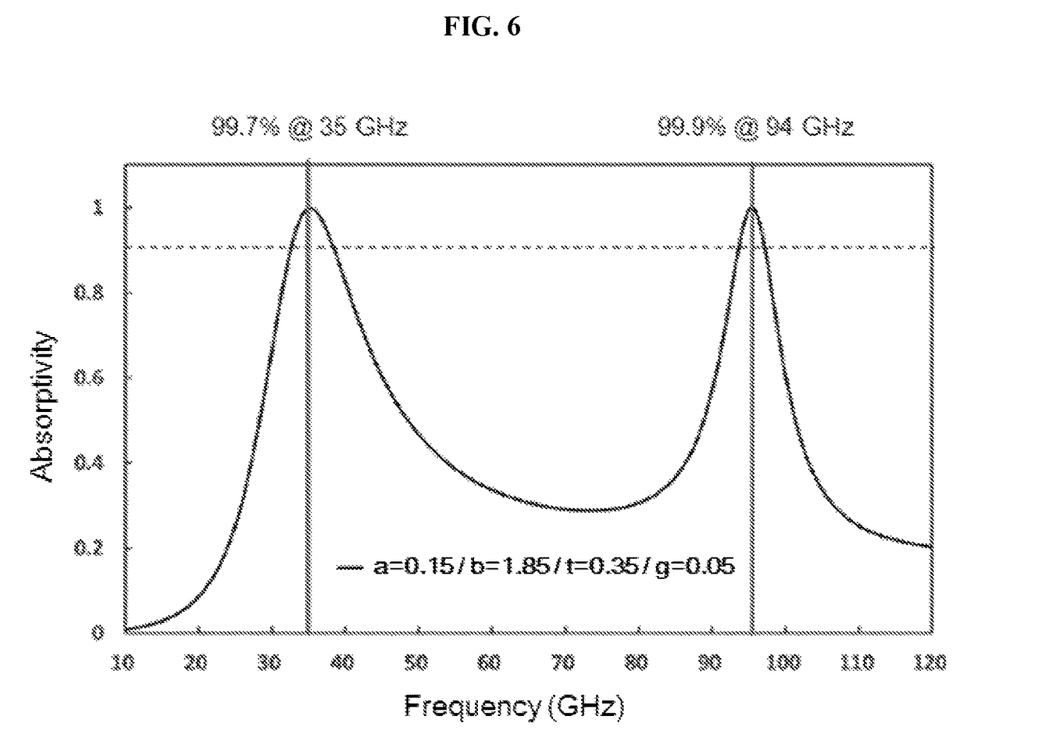
FIG. 6 is a graph showing a result of FDTD simulation of electromagnetic wave absorption characteristics based on a frequency of the stealth device according to the embodiment.

The stealth device 300 according to the present embodiment may implement a dual-band stealth function against electromagnetic waves of frequency (35 GHz and 94 GHz) bands mainly used for millimeter wave radar, and may realize the low emissivity of the infrared rays with a wavelength of 3 μm or larger. Further, the stealth device 300 according to the present embodiment may absorb near-infrared light through the near-infrared light transmissive hole formed in the thin-film patterns and then into the near-infrared absorption layer, and thus may realize the stealth function against the near-infrared light FIG. 6 is a graph showing the result of FDTD simulation of electromagnetic wave absorption characteristics based on the frequency of the stealth device according to the embodiment. In FIG. 6, the stealth device according to the embodiment has the structure shown in FIG. 1. The wavelength-selective absorption pattern layer includes the first thin-film pattern of a square shape with a side length of 1.85 mm, a second thin-film pattern of a square shape with a side length of 0.15 mm, and the two third thin-film patterns, each having a rectangular shape having a long side of 1.85 mm and a short side of 0.15 mm. Each of the first to third thin-film patterns is made of an ITO thin-film having a thickness of 200 nm. Each of the spacing between the first thin-film pattern and the third thin-film pattern and the spacing between the second thin-film pattern and the third thin-film pattern is about 0.05 mm.

Referring to FIG. 6, the stealth device according to the embodiment has absorption peaks at frequencies of 35 GHz and 94 GHz, and the electromagnetic wave absorptivity at the peak frequencies exceed 99%.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A stealth device comprising:
  a wavelength-selective absorption pattern layer including at least one conductive thin-film pattern having near-infrared light transmissive holes defined therein capable of selectively transmitting near-infrared light therethrough;
  a near-infrared absorption layer disposed below the wavelength-selective absorption pattern layer to absorb near-infrared light which has passed through the near- infrared light transmissive holes; and
  a dielectric layer disposed between the wavelength-selective absorption pattern layer and the near-infrared absorption layer and made of a dielectric material,
  wherein the wavelength-selective absorption pattern layer is composed of a plurality of unit areas, wherein each unit area has a square shape having two sides parallel to a first direction and two sides parallel to a second direction perpendicular to the first direction,
  wherein in each unit area, the conductive thin-film pattern includes:
    a first thin-film pattern having a planar shape of a first square having two sides parallel to the first direction and two sides parallel to the second direction, wherein each side of the first square has a first length;
    a second thin-film pattern having a planar shape of a second square having two sides parallel to the first direction and two sides parallel to the second direction, wherein each side of the second square has a second length smaller than the first length, wherein a diagonal line of the first thin-film pattern and a diagonal line of the second thin-film pattern coincide with one of two diagonal lines of the unit area; and
    two third thin-film patterns, wherein each of the two third thin-film patterns has a rectangular planar shape in which a long side parallel to the second direction has the first length and a short side parallel to the first direction has the second length, wherein one of the two third thin-film patterns is disposed adjacent to a first side of the first thin-film pattern, while the other thereof is disposed adjacent to a second side of the first thin-film pattern perpendicular to the first side of the first thin-film pattern.

2. The device of claim 1, wherein each of the near-infrared light transmissive holes has a circular shape with a diameter of 0.5 to 2.0 μm.

3. The device of claim 2, wherein the near-infrared light transmissive holes defined in the conductive thin-film pattern are regularly arranged, wherein a spacing between centers of two adjacently-disposed near-infrared light transmissive holes of the near-infrared light transmissive holes is 1.5 to 2.5 times of a diameter of each of the near-infrared light transmissive holes.

4. The device of claim 1, wherein the near-infrared absorption layer is made of at least one selected from a group consisting of graphite, germanium (Ge), silicon carbide (SiC), zinc oxide (ZnO), gallium nitride (GaN), gallium arsenide (GaAs), indium arsenide (InAs) and iron oxide (Fe2O3 or Fe3O4).

5. The device of claim 1, wherein the conductive thin-film pattern has a uniform thickness in a range of 100 nm to 10 μm.

6. The device of claim 1, wherein the near-infrared light transmissive holes are defined in each of the first to third thin-film patterns.

7. The device of claim 1, wherein the wavelength-selective absorption pattern layer has a first absorption peak at a first wavelength corresponding to a frequency region of 20 to 50 GHz and a second absorption peak at a second wavelength corresponding to a frequency region of 80 to 110 GHz.

8. The device of claim 7, wherein a length of each side of the first thin-film pattern is in a range of 1.0 to 4.0 mm, and a length of each side of the second thin-film pattern is in a range of 0.01 to 0.5 mm.

9. The device of claim 1, wherein each of a spacing between a long side of one of the third thin-film patterns and one side of the first thin-film pattern facing toward the long side of said one of the third thin-film patterns, and a spacing between a short side of said one of the third thin-film patterns and one side of the second thin-film pattern facing toward the short side of said one of the third thin-film patterns is in a range of 10 to 100 μm.

10. The device of claim 1, wherein the dielectric layer is made of:
an organic dielectric material selected from a group consisting of polyethylene terephthalate (PET), polymethyl methacrylate (PMMA), acrylonitrile butadiene styrene copolymer (ABS), polycarbonate (PC), and polyaramid; or
an inorganic dielectric material selected from a group consisting of silicon oxide (SiO2), silicon nitride (Si3N4) and glass.

11. The device of claim 1, wherein the device further comprises a reflective layer disposed below the near-infrared absorption layer, and made of a material capable of reflecting at least a portion of infrared ray.

12. A stealth device comprising:
a wavelength-selective absorption pattern layer made of a material having electrical conductivity, wherein the wavelength-selective absorption pattern layer is composed of conductive thin-film patterns capable of causing plasmonic resonance at a first wavelength and a second wavelength different from the first wavelength; and
a dielectric layer disposed below the wavelength-selective absorption pattern layer and made of a dielectric material,
wherein the wavelength-selective absorption pattern layer includes a plurality of unit areas, wherein each unit area has a square planar shape having two sides parallel to a first direction and two sides parallel to a second direction perpendicular to the first direction,
wherein the conductive thin-film patterns are disposed in each of the unit areas,
wherein the conductive thin-film patterns includes:
a first thin-film pattern having a planar shape of a first square having two sides parallel to the first direction and two sides parallel to the second direction, wherein each side of the first square has a first length;
a second thin-film pattern having a planar shape of a second square having two sides parallel to the first direction and two sides parallel to the second direction, wherein each side of the second square has a second length smaller than the first length, wherein a diagonal line of the first thin-film pattern and a diagonal line of the second thin-film pattern coincide with one of two diagonal lines of the unit area; and
two third thin-film patterns, wherein each of the two third thin-film patterns has a rectangular planar shape in which a long side parallel to the second direction has the first length and a short side parallel to the first direction has the second length, wherein one of the two third thin-film patterns is disposed adjacent to a first side of the first thin-film pattern, while the other thereof is disposed adjacent to a second side of the first thin-film pattern perpendicular to the first side of the first thin-film pattern.

13. The device of claim 12, wherein the wavelength-selective absorption pattern layer has a first absorption peak at a first wavelength corresponding to a frequency region of 20 to 50 GHz and a second absorption peak at a second wavelength corresponding to a frequency region of 80 to 110 GHz.

14. The device of claim 13, wherein the first to third thin-film patterns have the same thickness in a range of 100 nm to 10 μm,
wherein a length of each side of the first thin-film pattern is in a range of 1.0 to 4.0 mm, and a length of each side of the second thin-film pattern is in a range of 0.01 to 0.5 mm,
wherein each of a spacing between a long side of one of the third thin-film patterns and one side of the first thin-film pattern facing toward the long side of said one of the third thin-film patterns, and a spacing between a short side of said one of the third thin-film patterns and one side of the second thin-film pattern facing toward the short side of said one of the third thin-film patterns is in a range of 10 to 100 μm.

* * * * *